United States Patent [19]

Hawker et al.

[11] Patent Number: 6,114,458
[45] Date of Patent: Sep. 5, 2000

[54] HIGHLY BRANCHED RADIAL BLOCK COPOLYMERS

[75] Inventors: Craig Jon Hawker, Los Gatos; James Lupton Hedrick, Pleasanton; Olof Mikael Trollsas, Los Gatos, all of Calif.

[73] Assignee: International Business Machines Corporation, Armonk, N.Y.

[21] Appl. No.: 09/159,204

[22] Filed: Sep. 23, 1998

[51] Int. Cl.[7] .......................... C08F 20/00; C08F 283/00; C08G 63/00
[52] U.S. Cl. .......................... 525/242; 528/271; 528/274; 528/279; 528/281; 528/282; 528/283; 528/295.5; 528/300; 528/301; 528/303; 528/306; 525/437; 525/438; 525/440; 525/444; 525/445; 525/450; 424/DIG. 16
[58] Field of Search .................................. 528/271, 279, 528/274, 281–283, 295.5, 303, 300, 301, 306; 525/437, 438, 440, 444, 445, 450, 242; 424/DIG. 16

[56] References Cited

U.S. PATENT DOCUMENTS

| | | | |
|---|---|---|---|
| 3,962,347 | 6/1976 | Herz | 568/680 |
| 4,122,051 | 10/1978 | Friberg et al. | 524/236 |
| 4,694,064 | 9/1987 | Tomalia et al. | 528/332 |
| 5,120,790 | 6/1992 | Yu | 525/420 |
| 5,227,462 | 7/1993 | Turner et al. | 528/361 |
| 5,418,301 | 5/1995 | Hult et al. | 525/437 |
| 5,543,557 | 8/1996 | Bergvall | 560/209 |
| 5,559,201 | 9/1996 | Sörensen | 522/184 |
| 5,663,247 | 9/1997 | Sörensen et al. | 525/533 |

*Primary Examiner*—P. Hampton-Hightower
*Attorney, Agent, or Firm*—Thomas A. Beck

[57] ABSTRACT

A branched radial block copolymer including the reaction product of a dendritic macromolecular initiator, and one or more chain extending monomers.

16 Claims, 6 Drawing Sheets

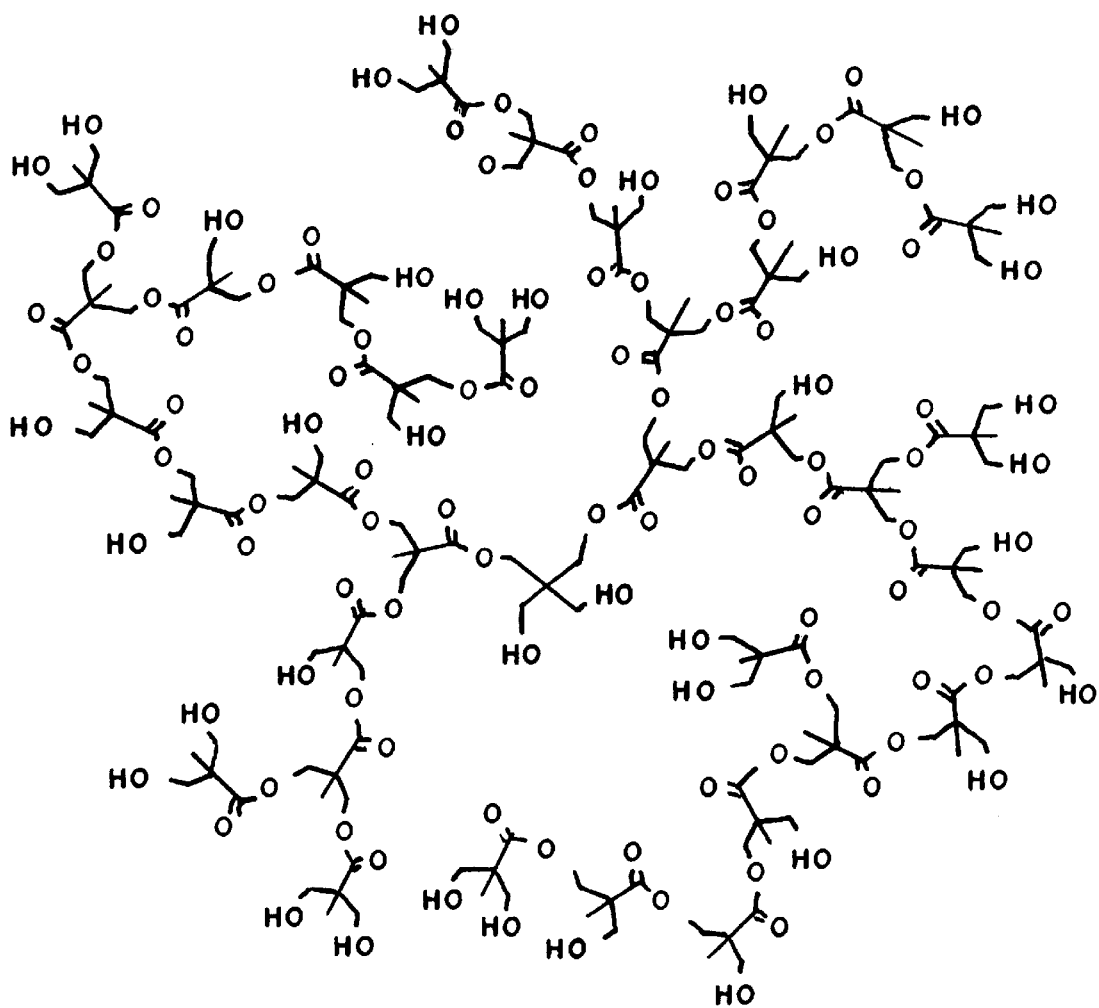
FIG.IB

HIGHLY BRANCHED RADIAL BLOCK COPOLYMERS

FIELD OF THE INVENTION

The invention relates generally to radial block copolymers. More specifically, the invention relates to highly branched radial block copolymers synthesized by dendritic initiation of aliphatic polyesters.

BACKGROUND OF THE INVENTION

Macromolecular engineering of complex molecular architectures through the introduction of controlled branching has become an increasingly important theme in polymer science. Accordingly, the synthesis of branched molecular architectures, such as hyperbranched, star, dendritic, and combburst macromolecules, is the goal of many research groups. This interest is driven by the unique mechanical and rheological properties of these nanoscopically tailored materials. Both dendrimers and hyperbranched macromolecules are prepared from $AB_2$ monomers although the different synthetic strategies lead to significantly different structures. Dendrimers are prepared by a stepwise series of reactions using either the divergent growth approach, which starts from a multifunctional core molecule and proceeds radially outward, or the convergent growth approach in which the synthesis starts at the periphery and well-defined dendrons are prepared followed by final coupling to a multifunctional core.

The repetitive nature of dendrimer synthesis, while tedious, does lead to an essentially perfectly branched structure. In contrast, hyperbranched macromolecules are prepared in a single-step polymerization process from $AB_x$ monomers, which greatly facilitates their availability but leads to polymers with irregular branching and broad molecular weight distributions are obtained.

Commercially available hyperbranched polyesters, derived from 2,2bis(hydroxymethyl) propionic acid (bis-MPA), have recently been introduced and are attractive for a number of technological applications. Other of hyperbranched polymers include those disclosed by Hult et al., U.S. Pat. No. 5,418,301 which teaches dendritic macromolecules of polyester, the initiator polymer having reactive hydroxyl groups. Sorensen et al., U.S. Pat. No. 5,663,247 also teaches hyperbranched macromolecules of the polyester type having at least one branching chain extender which has at least three reactive sites of which at least one is a hydroxyl or hydroxyl alkyl and at least one is a carboxyl or terminal epoxide group. The nucleus is an epoxide compound having at least one reactive epoxide group.

However, one of the drawbacks of all of these highly branched macromolecules is the inability of the globular, densely packed structures to entangle and to provide suitable mechanical properties. The resulting brittle materials limits the range of applications for which dendrimers or hyperbranched macromolecules are suitable.

As a result, there is a need for hyperbranched polymers which provide the desired mechanical and physical properties.

SUMMARY OF THE INVENTION

In order to overcome this and other problems, short linear chains, capable of entanglement, can be attached to the numerous chain ends of the dendritic macromolecules, effectively creating highly branched hybrid dendritic-linear block copolymers. One synthetic method in preparation of the polymer of the invention is to use the numberous chain-end functional groups as initiating sites for the growth of linear arms. The invention uses hyperbranched polyesters as well as their dendrimeric analogs, as multifunctional initiating cores for the synthesis of hybrid dendritic-linear star copolymers. The invention allows easy access to new highly branched macromolecules.

In accordance with a first aspect of the invention, there is provided a branched radial block copolymer comprising the reaction product of a dendritic macromolecular initiator; and one or more chain extending monomers.

In accordance with a preferred aspect of the invention, one or more chain extending monomers comprises a lactone monomer of the formula

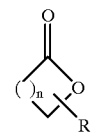

wherein R is H, $C_1$–$C_8$ linear alkyl aryl, substituted aryl, CN, OR, $OSiMe_3$, or $O_2CR$, and n ranges from 1 to 4.

In accordance with a further preferred aspect of the invention, the lactide monomer is selected from the group consisting of a glycolide monomer, a lactide monomer, and mixtures thereof.

DETAILED DESCRIPTION OF THE PREFERRED EMBODIMENTS

Figure 1A:
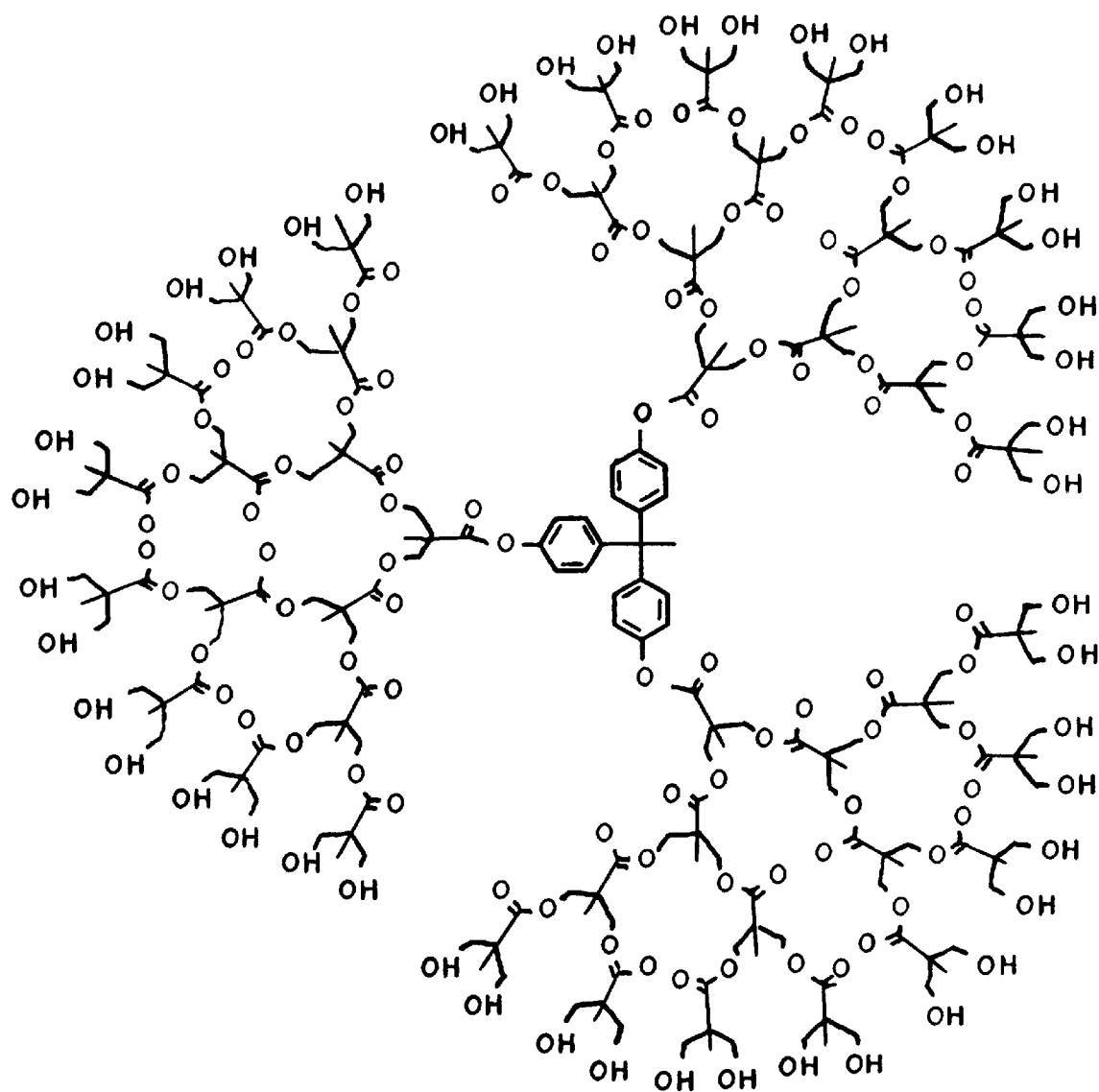
FIGS. 1 and 2 are schematic depictions of dendritic polymers.

The invention concerns the multiple extension of hyperbranched macromolecules with various reactive chain extending monomers through ring opening polymerization. The reaction may take place in any suitable solvent to provide linear macromolecules of longer chain length and much enhanced physical properties.

The Macromolecular Initiator

Generally any number of initiator polymers may be used in accordance with the invention. Distinctive of those polymeric initiators useful in the invention is a high degree of reactive functionality such as hydroxyl, amine, thiol, or other groups that initiate ring opening polymerization.

Generally, the initiator is a hyperbranched or dendritic molecule. Dendritic macromolecules (dendrimers) can generally be described as three dimensional highly branched molecules having a tree-like structure. Dendrimers are highly symmetric, while similar macromolecules designated as hyperbranched may have to a certain degree of asymmetry, yet maintaining the highly branched tree-like structure. Dendrimers can be said to be mosodisperse variations of hyperbranched macromolecules. Hyperbranched and dendritic macromolecules normally consist of a nucleus having one or more reactive sites and a number of surrounding branching layers and optionally a layer of chain terminating molecules. The layers are usually called generations, a designation hereinafter used.

The composition of hyperbranched dendritic or near dentritic macromolecules having two or three generations can be illustrated by below Formulas (I) and (II):

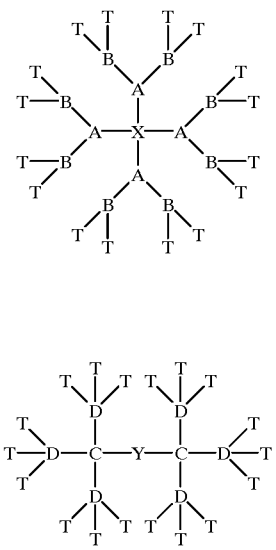

(I)

(II)

wherein
X and Y are nucleons having four and two reactive sites, respectively, and A, B, C, and D are chain extenders having three (A and B) and four (C and D) reactive sites, each extender forming one generation in the macromolecule.

T is a terminating chain stopper forming the third and last generation. T may either be monofunctional or give a suitable terminal functionality, consisting for instance of hydroxyl, thiols, amines or other functional groups that can initiate ring opening polymerization.

Hyperbranched macromolecules of the polyester type provide highly branched, highly functional structure and, in turn, provide great advantages including low viscosity and high compatibility.

The dendritic macromolecule initiator used according to the invention comprises a central initiator molecule or initiator polymer having one or more reactive groups (A), which groups (A) under formation of an initial tree structure are bonded to reactive groups (B) of a monomeric chain extender holding the two reactive groups (A) and (B), which tree structure optionally is extended and further branched from the initiator molecule or initiator polymer by the addition of further molecules of a monomeric chain extender through bonding between the reactive groups (A) and (B) thereof. The tree structure is optionally further extended by reaction with a chain stopper. The macromolecule is characterised in that the reactive groups (A) and (B) are hydroxyl groups (A) and carboxyl groups (B), respectively, and that the chain extender has at least one carboxyl group (B) and at least two hydroxyl groups (A) or hydroxyalkyl substituted hydroxyl groups (A).

Ester functional dendrimers maybe prepared in accordance with Hult et al., U.S. Pat. No. 5,418,301, which is incorporated herein by reference, are useful in the invention. Preferred macromolecular initiators include those available from Perstorp, A. B. of Sweden such as those sold under the tradename Boltron.

The Monomeric Chain Extender

The monomeric chain extender functions to extend the length of the various linear branches, arms or chains of the macromolecular initiator and may be any compound macromonomer which functions to this end. Useful chain extenders include those lactones, cyclic carbonates, epoxides, and anhydrides, among other cyclic monomers capable of undergoing ring opening polymerization.

Preferably the chain extender is a monomer of molecular weight ranging from about 50 to 1500 and has lactone functionality. One preferred family of chain extenders includes lactones and dilactones such as those found in Tables 1 and 2 below.

TABLE 1

| Lactones | |
|---|---|
| ![lactone structure] | R = H; n = 1: β-pl, β-propiolactone<br>R = H; n = 2: γ-BL, γ-butyrolactone<br>R = H; n = 3: δ-VL, δ-valerolactone<br>R = H; n = 4: ε-CL, ε-caprolactone<br>R = CH$_3$; n = 1: β-BL, β-butyrolactone |
| ![DXO structure] | DXO, 1,5-dioxepan-2-one |
| ![pivalolactone structure] | pivalolactone |

TABLE 2

| Dilactones | |
|---|---|
| ![glycolide structure] | glycolide |
| ![D-lactide structure] | D-LA, D-lactide ⎫<br><br>⎬ D-LA/L-LA (50/50) =<br>⎪ D,L-LA, (D,L)-<br>⎪ racemic lactide<br>L-LA, L-lactide ⎭ |

TABLE 2-continued
Dilactones
meso-LA, meso-lactide
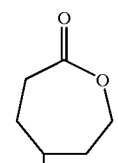
Other representative lactones include those found in Table 3 below.
TABLE 3
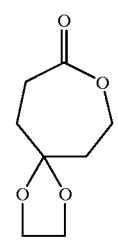
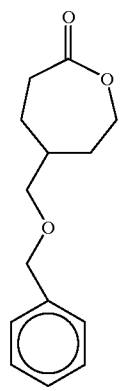
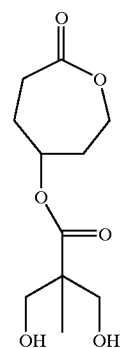
TABLE 3-continued
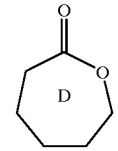
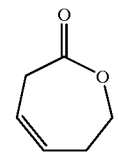

Other cyclic compounds useful in the ring opening polymerization of the invention include those found below in Table 4.

TABLE 4

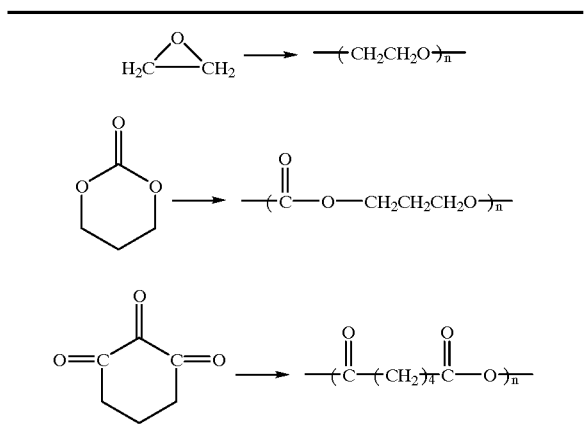

The invention also comprises a process for preparation of the claimed copolymer. The process is characterised in that the macromolecular initiator has one or more hydroxyl groups which are reacted at a temperature of 100°–150° C., preferably about 110° C., with a chain extender. The reaction product obtained is thereafter may be further reacted with a chain stopper.

The molar ratio between the number of moles used chain extender per mole hydroxyl groups originating from the initiator molecule or initiator polymer is suitably to be found between 1:1 and 2000:1, preferably between 1:1 and 1100:1. In certain cases the ratio is between 1:1 and 500:1 such as between 1:1 and 100:1.

The reaction can be carried out without using any catalyst. An ordinary esterification catalyst is, however, used in many cases and then suitably selected among
  a) a Bronstedt acid such as napththalene sulphonic acid, para-toluene sulphonic acid, methane sulphonic acid, trifluoromethane sulphonic acid, trifluoroacetic acid, sulphuric acid or phosphoric acid
  b) a Lewis acid such as $EF_3$, $AlCl_3$, $SnCl_4$
  c) a titanate as tetrabutyl titanate
  d) zinc powder or an organozinc compound
  e) tin powder or an organotin compound The polymerization may be completed under bulk polymerization conditions with solvents such as toluene. The resulting polymer may have a molecular weight ranging from about 20,000 to 250,000 Mn or greater, perferably greater than about 60,000 Mn, and more preferably greater than about 100,000 Mn.

Applications

The copolymer of the invention may be used in any number of different applications depending upon the properties of the resulting polymer. For example, the copolymer of the invention may be used as a toughener for thermoset resins, a viscosity modifier for linear polymers, or as a suspension or emulsion stabilizer. The copolymers may also be used in various adhesive applications or for hardening paints, forming protective coatings, or as a pore generator for organic thermosets. Other applications include drug delivery vehicles or medical devices such as sutures and biomedical applications, as well as providing micelleular structure for cosmetics.

Working Example

The following disclosure is an embodiment of the invention which is exemplary and nonlimiting.

Living ring opening polymerization of ε-caprolactone initiated from the numerous chain end hydroxymethyl groups of the analogous dendrimeric and hyperbranched polyesters derived from 2,2-bis(hydroxymethyl) propionic acid is described. By controlling the size of the dendritic macromolecule and the molar ratio of ε-caprolactone a variety of highly branched radial block copolymers are obtained Comparison of the results obtained for the dendrimeric and hyperbranched initiators demonstrates that the reactivity of the chain end hydroxymethyl groups in the dendrimer are significantly greater than in the isomeric hyperbranched case.

Toluene was dried by refluxing over sodium and distilled under nitrogen prior to use. The caprolactone (Aldrich) was dried over $CaH_2$ distilled under pressure, and stored under a nitrogen atmosphere. The 2,2'-bis(hydroxymethyl) propionic acid was obtained from Aldrich and used without further purification. The stannous 2-ethyl-hexanoate, $Sn(Oct)_2$, was purchased from Sigma and used without further purification. The hydroxy-terminated hyperbranched polymers were kindly supplied by Perstorp. The corresponding fourth generation dendrimer was prepared by Hult and coworkers according to a literature procedure.

The dendritic and hyperbranched polyesters used as the macroinitiators for the ring opening polymerization of caprolactone were dried by an azeotropic distillation with toluene (3X) and stored in a dry box until used. The caprolactone was added to a previously flamed flask containing the initiator. The flask was heated to 110° C. where the caprolactone dissolved the initiator forming a homogeneous mixture. In some cases a small amount of toluene was required to facilitate the dissolution. $Sn(Oct)_2$ was added and the reaction was maintained at 110° C. for 20 h, the polymers were then dissolved in THF and precipitated into cold methanol.

$^1$H—NMR and $^{13}$C—NMR spectra were recorded with a Bruker AM 250 (250 MHz) spectrometer. Size exclusion chromatography was carried out on a Waters chromatograph connected to a Waters differential refractometer. Four 5 micron Waters columns (300×7.7 mm) connected in series in order of increasing pore size (100, 1000, 10,000 and 100,000 Å) were used with THF as the solvent The choice of polymerization reaction for growth of the linear chains from the dendritic polyesters was dictated by the presence of numerous hydroxymethyl groups at the chain ends of both the dendrimeric, 1, and hyperbranched derivatives, 2 (FIG. 1). The living ring-opening polymerization (ROP) of ε-caprolactone from both mono (hydroxymethyl) and bis(hydroxymethyl) groups is a facile process leading to controlled molecular weight, low polydispersity products. The key to this synthesis is the use of catalytic amounts of an organometallic promoter, such as stannous 2-ethylhexanoate, $Sn(Oct)_2$, in order to minimize complexation which deleteriously affects the living nature of the polymerization. It was therefore decided to investigate the synthesis of caprolactones based hybrid star copolymers in which the central, dendritic core is derived from highly branched, bis-MPA derivatives, 1 or 2, and the numerous arms are linear poly(caprolactone) prepared by living ring opening polymerization of ε-caprolactone initiated from the terminal hydroxymethyl groups.

The materials chosen for study were generations 2–5 of the hydroxy-terminated hyperbranched polyesters (2-Gx)

commercially available from Perstorp and the corresponding dendrimer of generation 4. Since the ring opening polymerization of ε-caprolactone is normally performed under bulk conditions the high solubility of the dendrimers and hyperbranched macromolecules greatly facilitates the polymerization and only at very low monomer to initiator ratios (DP<10) was it necessary to add small amounts of toluene to the reaction mixture to dissolve the dendritic initiator as well as plasticize the highly viscous melt. For example, reaction of the hyperbranched polyester, 2-G5 (nominally generation 5), with 1280 equivalents of ε-caprolactone at 110° C. for 20 hours in the presence of 2.0 milli-equivalents of Sn(Oct)$_2$ gave the desired radial block copolymer, 4OG5-10, in 93% yield [$M_n$=210,000; PD.=2.60] (FIG. 1). The number average molecular weight of each arm was determined by $^1$H NMR and shown to be 41 which agrees closely to that predicted by the monomer to initiator ratio, 40. By varying this ratio and the size, or generation number of the hyperbranched macromolecule, hybrid materials with molecular weights ranging from 20,000 to 210,000 a.m.u. could be obtained. See Table 3 below:

TABLE 3

Hydroxy-Functional Hyperbranched Polyester Initiated Poly(caprolactone) Synthesis

| Sample Entry | Initiator (polyester generation) | Poly(caprolactone),DP | | <$M_n$>,GPC g/mol | ≤$M_w$≥ < $M_w$ > |
|---|---|---|---|---|---|
| | | Target | Measured ($^1$H-NMR) | | |
| 4-G2-10 | 2-G2 | 10 | 11 | 34,000 | 1.40 |
| 4-G2-40 | | 40 | 35 | 65,000 | 1.40 |
| 4-G3-10 | 2-G3 | 10 | 10 | 22,000 | 1.85 |
| 4-G3-40 | | 40 | 41 | 86,000 | 1.84 |
| 4-G4-10 | 2-G4 | 10 | 12 | 33,000 | 2.00 |
| 4-G4-40 | | 40 | 40 | 121,000 | 1.70 |
| 4-G5-10 | 2-G | 10 | 12 | 48,000 | 2.40 |
| 4-G5-40 | | 40 | 41 | 210,000 | 2.60 |

TABLE 4

Characteristics of Hyperstar Polymers Initiated from 1

| Sample Entry | <$M_n$>g/mol | | Degree of Polymerization Per Arm | | <$M_w$> <$M_n$> |
|---|---|---|---|---|---|
| | Target | Measured$^a$ | Target | Measured$^b$ | |
| 3-6 | 33,600 | 31,400 | 6 | 5.7 | 1.18 |
| 3-20 | 96,000 | 115,200 | 20 | 21 | 1.17 |

$^a$SEC values relative to polystyrene samples.
$^b$H-NMR from end group analysis.

In a similar fashion, the initiation of ε-caprolactone from the dendrimeric analogs proved to be extremely facile and gave the desired block copolymers with accurate control over molecular weight and polydispersity as seen in Table 4 above. For example, the polymerization of 960 molar equivalents of ε-caprolactone with the fourth generation dendrimer, (1 in FIG. 1) which has 48 hydroxyl groups at the chain ends was carried out in bulk at 110° C. for 20 hours to give the hybrid dendrimer-linear block copolymer, Samples 3–20, in 96% yield [$M_n$=115,000; PD.=1.18]. GPC analysis of 3–20 showed a single monomodel peak with a polydispersity of 1.18 and the average degree of polymerization per arm or hydroxyl functional group was determined using $^1$H NMR. In this case the analysis is greatly facilitated by the symmetrical and highly regular nature of the dendrimeric core and comparison of the integration values for the methylene protons of the linear caprolactone backbone with those for the core moity revealed a degree of polymerization per arm of 21. This compares favorable with the theoretical value of 20 and similar data was generated for a lower molecular weight hybrid dendritic-linear block copolymer, as seen in Samples 3–10, Table 4.

Figure 2A:
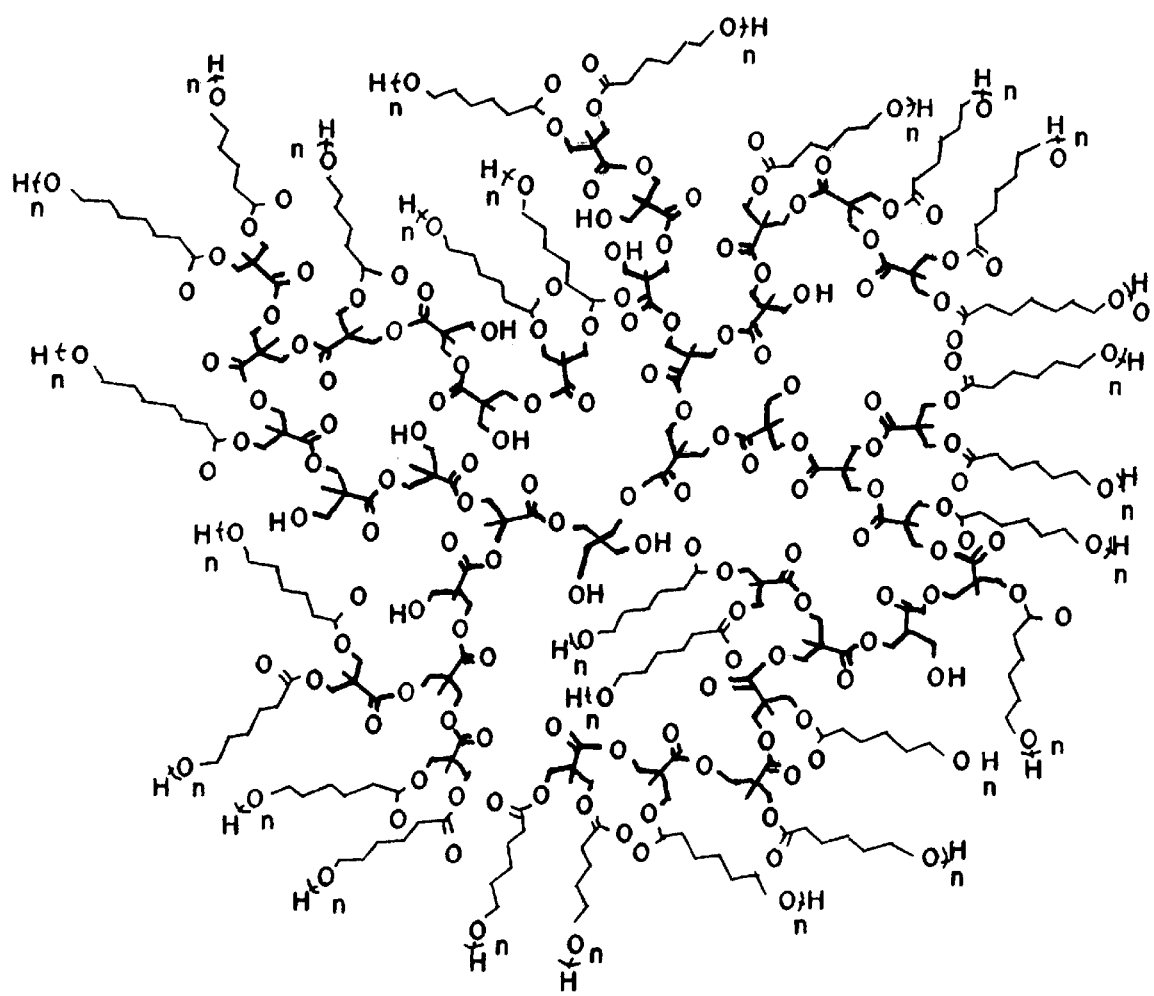
Figure 2B:
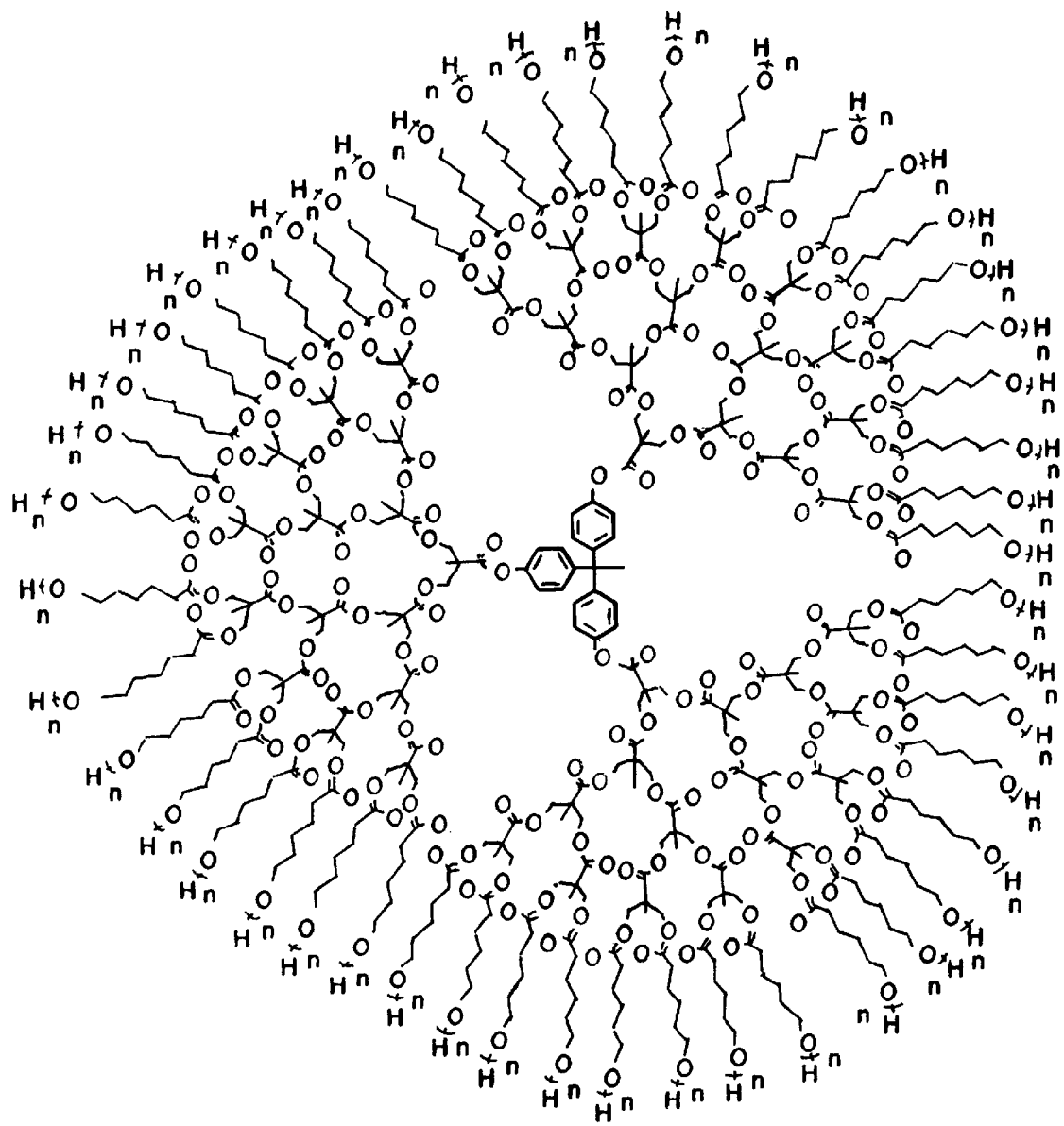

An interesting observation can be made when the polydispersities of the radial star block copolymers prepared from both the dendrimeric and hyperbranched cores are compared. As expected the polydispersities of the dendrimeric derivatives, 3-n, are low and only slightly increased when compared to the starting dendrimer, 2 (FIGS. 1 and 2). In contrast, the polydispersities for the hyperbranched derivatives, 4-Gx-n, are significantly more polydispersed (ca. 2.0–2.5) than would be expected simply based on the increased polydispersity of the starting hyperbranched initiators (ca. 1.3). A possible rationale for this behavior is that while the dendrimeric derivatives have only 1,3-substituted bis(hydroxymethyl) terminal groups, the hyperbranched derivatives, with a much lower degree of branching (ca. 50%), have almost twice as many mono(hydroxymethyl) terminal groups as 1,3-substituted bis(hydroxymethyl) groups. The initiation of ε-caprolactone from monohydroxyl species typically gives linear polymers with broader polydispersities (ca. 1.6–1.8) than those obtained from low molecular weight 1,3-substituted bis (hydroxymethyl) derivatives (ca. 1.05–1.20), the presence of considerable amounts of mono-hydroxy initiating sites for 2-Gn, coupled with the possible increased steric hindrance for those sites, leads to much less efficient growth and the observed increase in polydispersity.

Figure 3A:
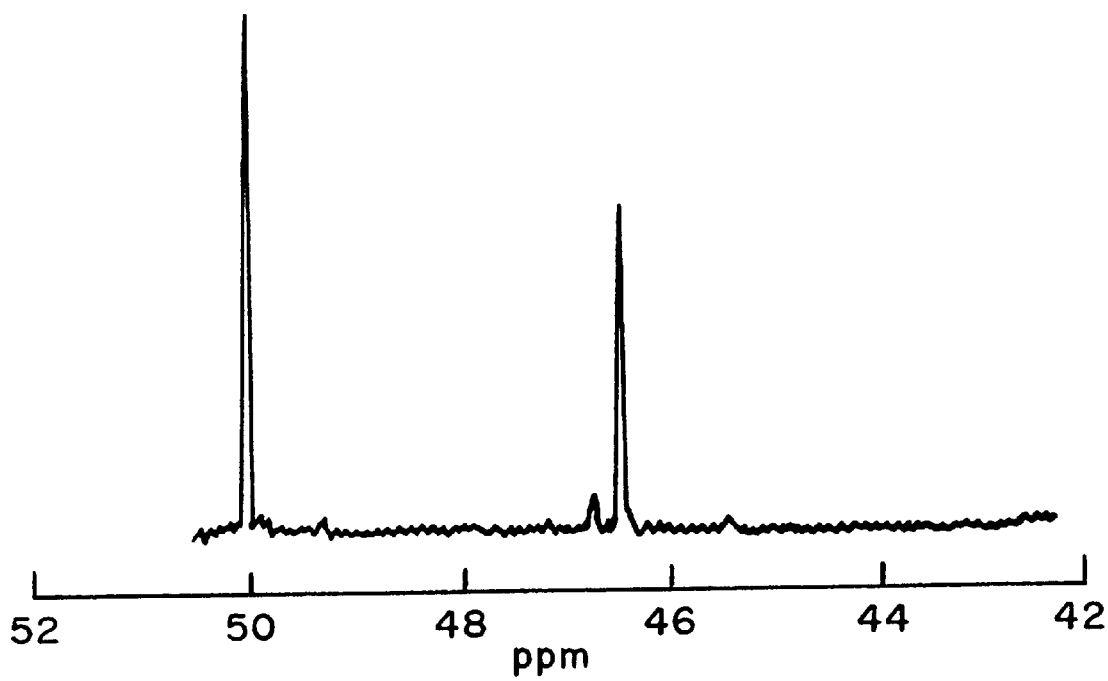
FIGS. 3 and 4 are graphical depictions of $^{13}C$—NMR data resulting from the Working Example.
Figure 3B:
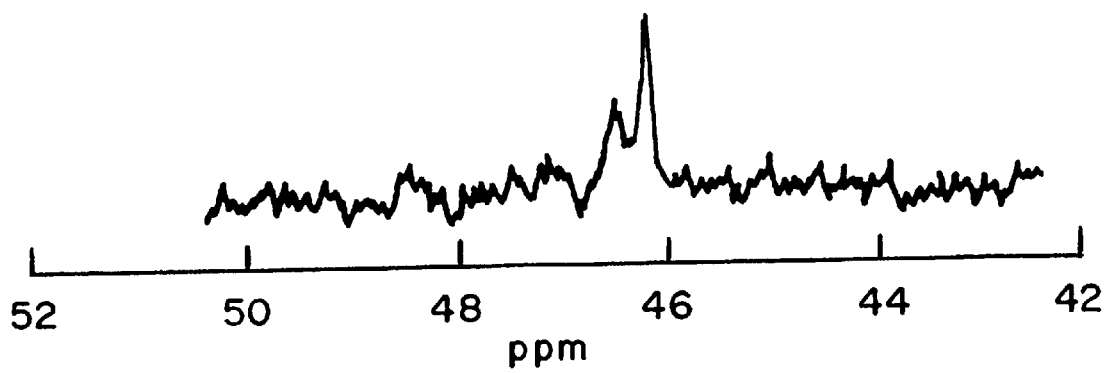
Figure 4A:
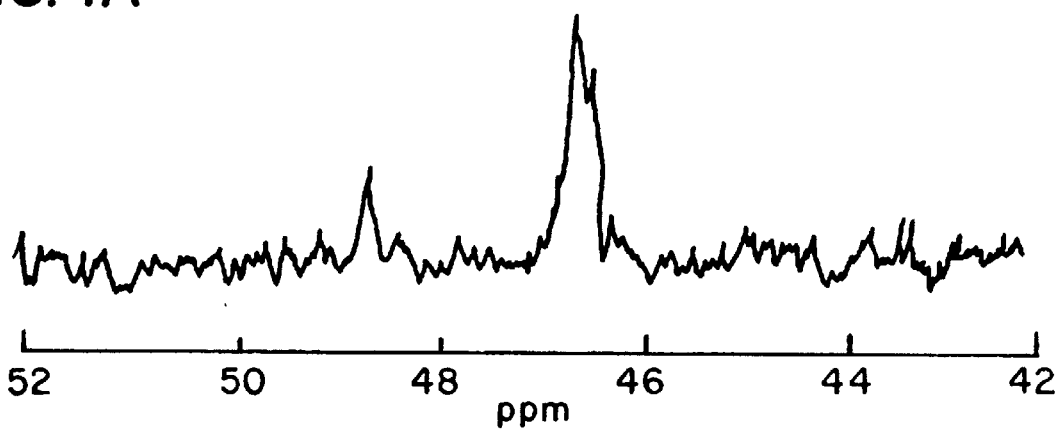
Figure 4B:
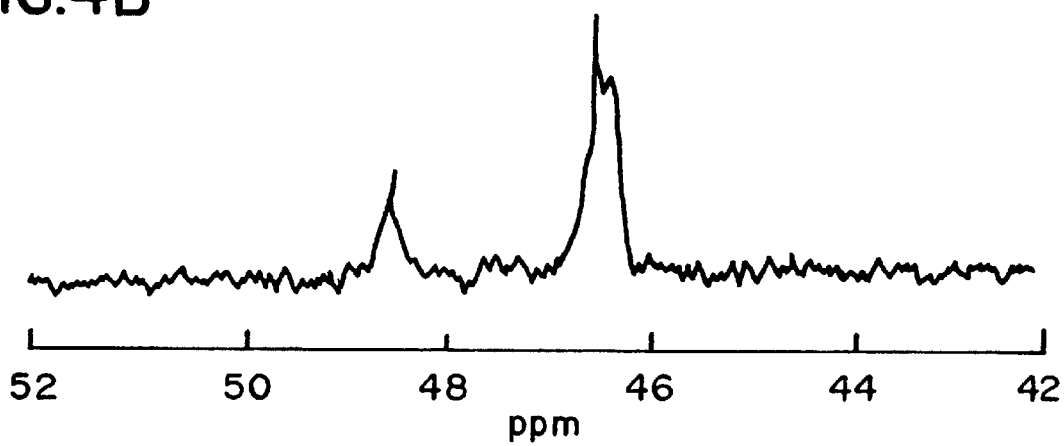
Figure 4C:
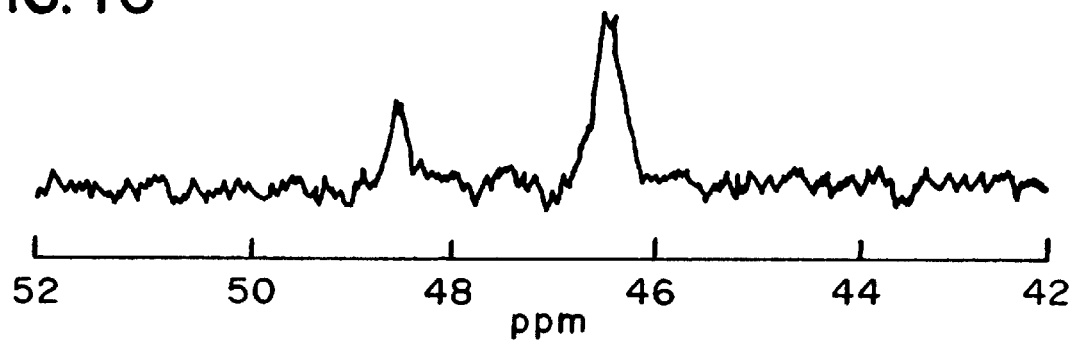
Figure 4D:
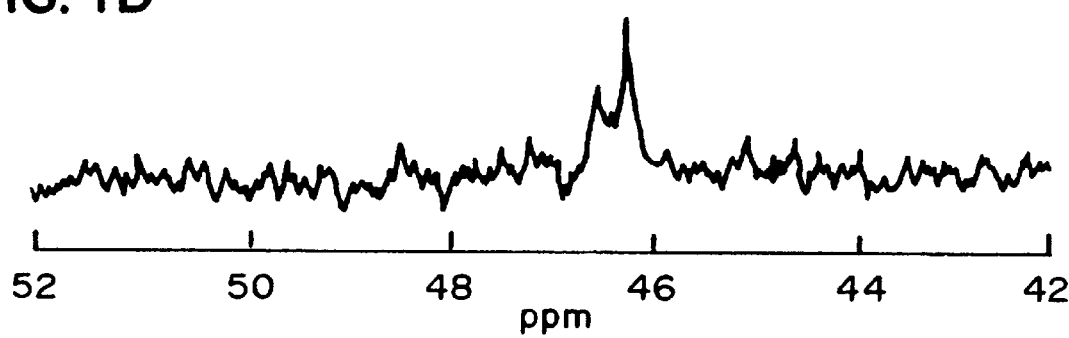

To answer this question in greater detail, $^{13}$C NMR was used to investigate the efficiency of initiation from the various terminal initiating sites for both 1 and 2-Gx-n. This study was greatly facilitated by the observation that the $^{13}$C NMR resonance (CDCl$_3$) for the quaternary carbon of the bis-MPA repeating units is very sensitive to the level of substitution. For dendritic, or diacylated units the chemical shift of the quaternary carbon appears at ca. 46 ppm, while the linear, or monoacylated units are observed at ca. 48 ppm, and the terminal or unsubstituted repeat units are found at ca. 50 ppm. For the dendrimeric derivatives comparison of the $^{13}$C NMR spectra for the starting material, 1, with the hybrid star copolymer, 3–20, shows the complete disappearance of the resonance for the terminal repeat units at 50.5 ppm of 1 and the presence of resonances for only diacylated repeat units at 46.3 ppm FIG. 3. This clearly demonstrates that complete initiation is occurring from the chain ends of the fourth generation dendrimer, 1 (FIG. 1), commensurate with previous studies.

In contrast, the $^{13}$C NMR spectra for the starting hyperbranched polyesters, 2Gx, showed the expected three resonances which correlates with the low degree of branching (ca. 50%). While the hybrid copolymers, 4-Gx-n, did show the expected disappearance of the resonance for the terminal repeat units they did not, however show the expected disappearance of the resonance for the linear units FIG. 4. Instead this set of peaks is still present at 48.5 ppm and is only decreased in size relative to the resonances for the dendritic units at 46.3 ppm. These data are shown in FIG. 4 along with the $^{13}$C NMR spectra of 3–20 to facilitate comparison. The complete disappearance of the terminal units coupled with the presence of unreacted linear units suggests that the reactivity of the terminal repeat units are significantly greater that the corresponding linear units, possibly due to a combination of steric and electronic effects. For example, steric factors may not allow the requisite coordination-insertion mechanism to proceed with some of the "buried" hydroxyl groups. Significantly, this result clearly demonstrates that the reactivity of chain end functional groups in dendrimers is different to, and greater than the isomeric hyperbranched macromolecules.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. A branched radial block copolymer comprising the reaction product of:
   a) a dendritic macromolecular initiator; and
   b) one or more chain extending monomers selected from the group consisting of an epoxy compound, an anhydride compound, a cyclic carbonate compound, and mixtures thereof, and a lactone monomer of the formula:

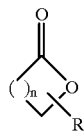

wherein R is H, $C_1$–$C_8$ linear alkyl, aryl, substituted aryl, CN, OR, $OSiMe_3$, and n ranges from 1 to 4.

2. The copolymer of claim 1, wherein said lactone monomer is selected from the group consisting of β-propiolactone, γ-butyrolactone, δ-valerolactone, ε-caprolactone, β-butyrolactone, and mixtures of thereof.

3. The copolymer of claim 1, wherein said lactone monomer comprises 1,5-dioxepan-2-one.

4. The copolymer of claim 1, wherein said lactone monomer comprises pivalolactone.

5. The copolymer of claim 1, wherein said one or more chain extending monomer comprises a lactide monomer.

6. The copolymer of claim 5, wherein said dilactone monomer is selected from the group consisting of a glycolide monomer, a lactide monomer, and mixtures thereof.

7. The copolymer of claim 6 wherein said D-lactide monomer is selected from the group consisting of a D-lactide monomer, a L-lactide monomer, a meso lactide monomer, and mixtures thereof.

8. The copolymer of claim 1, wherein said dendritic macromolecular initiator comprises:
   (i) a central core molecule or core polymer having at least one reactive hydroxyl group (A), which hydroxyl group (A) under formation of an initial tree structure is bonded to a reactive carboxyl group (B) in a monomeric chain extender having the two reactive groups (A) and (B), which tree structure is $A_xB$ wherein X is 2 or greater and
   (ii) optionally is extended and further branched from the initiator molecule or initiator polymer through an addition of further molecules of a monomeric chain extender by means of bonding with the reactive groups (A) and (B) thereof and
   (iii) optionally is further extended through reaction with a chain stopper and wherein the monomeric chain extender has at least one carboxyl group (B) and at least two hydroxyl groups (A) or hydroxyalkyl substituted hydroxyl groups (A).

9. The copolymer of claim 8, wherein said core dendritic initiator molecule or initiator polymer is selected from the group consisting of:
   a) an aliphatic, a cycloaliphatic or an aromatic diol
   b) a triol
   c) a tetrol
   d) a sugar alcohol
   e) anhydroennea-heptitol or dipentaerythritol
   f) an α-alkylglucoside
   g) a monofunctional alcohol
   h) an alkoxylate polymer having a molecular weight of at most 8000 and being produced by reaction between an alkylene oxide and one or more hydroxyl groups originating from compounds a) through g).

10. The copolymer of claim 9 wherein said core molecule is selected from the group consisting of ditrimethylolpropane, ditrimethylolethane, dipentaerythrithol, pentaerythritol, alkoxylated pentaerythritol, trimethylolethane, trimethylolpropane, alkoxylated trimethylolpropane, glycerol, neopentyl glycol, dimethylolpropane, 1,3-dioxane-5,5-dimethanol, sorbitol, mannitol and α-methylglucoside.

11. The copolymer of claim 8 wherein the branched chain extender is selected from the group consisting of:
   a) a monofunctional carboxylic acid having at least two hydroxyl groups
   b) a monofunctional carboxylic acid having at least two hydroxyl groups wherein one or more of the hydroxyl groups are hydroxyalkyl substituted.

12. The copolymer of claim 11 wherein said chain extender is selected from the group consisting of dimethylolpropionic acid, α,α-bis(hydroxymethyl)butyric acid, α,α,α-tris(hydroxymethyl)-acetic acid, α,α-bis-(hydroxymethyl)valeric acid, α,α-bis(hydroxy)propionic acid and 3,5-dihydroxybenzoic acid.

13. The copolymer of claim 8 wherein said macromolecule is chain stopped and the chain stopper is selected from the group consisting of:
   a) a saturated monofunctional carboxylic acid or a saturated fatty acid or an anhydride thereof
   b) an unsaturated fatty acid
   c) an unsaturated monofunctional carboxylic acid
   d) a diisocyanate or an oligomer thereof
   e) an adduct of a reaction product of a diisocyanate or an oligomer thereof
   g) an adduct of a reaction product difunctional or a polyfunctional carboxylic acid or an anhydride thereof
   f) a difunctional or polyfunctional carboxylic acid or an anhydride thereof
   g) an adduct of a reaction product difunctional or a polyfunctional carboxylic acid or a polyfunctional carboxylic acid or an anhydride thereof
   h) an aromatic monofunctional carboxylic acid
   i) an epihalohydrin
   j) a glycidyl ester of a monofunctional carboxylic acid or of a fatty acid, which acid has 1–24 carbon atoms
   k) an epoxide of an unsaturated fatty acid with 3–24 carbon atoms.

14. The copolymer of claim 13 wherein said chain stopper is selected from the group consisting of lauric acid, linseed fatty acid, soybean fatty acid, tall oil fatty acid, dehydrated castor fatty acid, capric acid, caprylic acid, trimethylolpropane diallyl ether maleate, metacrylic acid, acrylic acid, benzoic acid, para-tert.butylbenzoic acid, 1-chloro-2,3-epoxy propane, 1,4-dichloro-2,3-epoxy butane and epoxidized soybean fatty acid.

15. The copolymer of claim 8 wherein said macromolecule is chain stopped and wherein the chain extender is dimethylolpropionic acid and the initiator molecule is selected from the group consisting of ditrimethylolpropane, trimethylolpropane, ethoxylated pentaerythritol, pentaerythritol and glycerol.

16. The copolymer of claim 8 wherein said dendritic macromolecule is a constituent in the preparation of a product selected from the group consisting of:

a) an alkyd, an alkyd emulsion, a saturated polyester or an unsaturated polyester,
b) an epoxy resin,
c) a phenolic resin,
d) an amino resin,
e) a polyurethane resin, foam or elastomer,
f) a binder for radiation curing or powder systems,
g) an adhesive,
h) a synthetic lubricant,
i) a microlithographic paint,
j) a composite reinforced with glass, aramid or carbon/graphite fibres,
k) a molding compound based on urea-formaldehyde resins, melamine-formaldehyde resins or phenol-formaldehyde resins,
l) a dental material, and
m) a pore generating material.

* * * * *